July 1, 1952

F. ERNST 2,602,010

PISTON RING

Filed May 10, 1946

INVENTOR
Fred Ernst
BY John Flam
ATTORNEY

Patented July 1, 1952

2,602,010

UNITED STATES PATENT OFFICE 2,602,010

PISTON RING

Fred Ernst, Gardena, Calif., assignor to
Guy H. Hall, Los Angeles, Calif.

Application May 10, 1946, Serial No. 668,860

9 Claims. (Cl. 309—45)

This invention relates to means for sealing between a piston and the wall of the cylinder in which the piston operates; more particularly, it relates to such means comprising one or more piston rings which cooperate in a novel manner.

It is known to provide pistons, such as are employed in internal combustion engines, or the like, with a plurality of sealing rings for the purpose of preventing escape of the combustible mixture between the cylinder wall and the piston, as well as to prevent passage of excessive quantities of lubricating oil past the piston into the combustion chamber. However, in general, such rings do not have any special cooperation other than what may be termed a cumulative effect, each of the compression rings serving to prevent "blow by" and to limit the passage of oil independently of the other rings, while the oil ring operates independently to return most of the oil from the cylinder wall to the crank case.

It is an object of this invention to provide a plurality of piston ring structures which cooperate in a novel manner to effect these functions.

It is another object of this invention to provide an improved compression ring and an improved oil ring, adapted to cooperate with each other in a novel manner.

It is another object of this invention to provide an oil ring structure having an axially movable ring member which is economical to manufacture, easily installed on the piston, and which facilitates the provision of large oil return passages.

It is still another object of this invention to provide a compression ring arranged to provide an oil-filled channel for the dual purpose of forming a hydraulic seal between the piston and the cylinder wall, and of cooling the piston and ring.

It is another object of this invention to provide an improved piston which may be equally as well used with conventional rings.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 1:
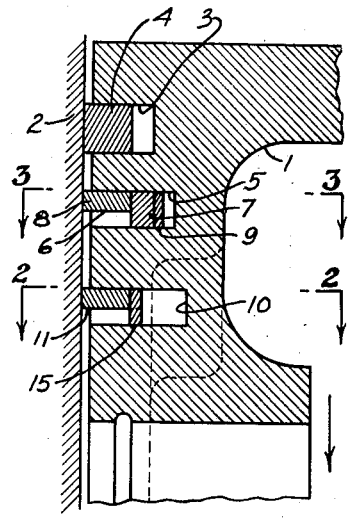
Figure 1 is a fragmentary, transverse section of a piston utilizing rings embodying the features of the invention, taken as indicated by lines 1—1 of Fig. 2.

Referring to the drawing, a fragment of a piston is indicated by the numeral 1, and a portion of the cooperating cylinder wall is shown at 2. Near its upper end the piston 1 is provided with a groove 3 accommodating a conventional compression ring 4. A second groove 5 is provided below the groove 3 for accommodating a compression ring structure 6 of novel form. This structure comprises an inner or seal ring 7, and an outer ring 8. The inner ring 7 is a split ring formed of steel, cast iron, or a suitable alloy, and has concentric inner and outer surfaces, as well as parallel faces adapted to form a fluid-tight seal with the ring lands or sides of the groove 5. The outer ring 8 is also a split ring with concentric inner and outer surfaces, the inner surface forming a fluid-tight seal with ring 7, the outer surface sealing against the cylinder wall 2. The ring 8 may be formed of steel, cast iron, bronze, or other suitable material, and has a thickness substantially equal to, but not less than, one-half of the width of the groove 5. This ensures against overlapping of the end portions of the ring. Thus, rings 7 and 8 cooperate to form a complete seal: ring 7 against opposite lands of groove 5; and ring 8 against the cylinder surface and the outer surface of ring 7.

Due to the resilient engagement of ring 8 with the cylinder wall 2, the ring 8 traverses the groove 5 when the direction of movement of the piston 1 reverses at the end of the stroke. A spring expander 9 may be provided within the inner ring 7 for urging rings 7 and 8 radially outwardly into sealing relation, so as to provide the seal between the ring 8 and cylinder 2.

Another ring groove 10 is provided in the piston 1 below the groove 5 for accommodating an oil control ring 11. This ring 11 is a split ring with concentric inner and outer surfaces, and having a thickness substantially equal to, but not less than, one-half the width of the groove 10, to ensure against overlapping of the end portions of the ring. As before, the ring 11 may be formed of cast iron, steel, or other suitable alloy; and, by its resilient engagement with the cylinder wall 2, is caused to traverse the groove 10 when the direction of movement of the piston is reversed. The groove 10 is vented to the interior of the piston, the venting being controlled by the ring 11.

Figure 2:
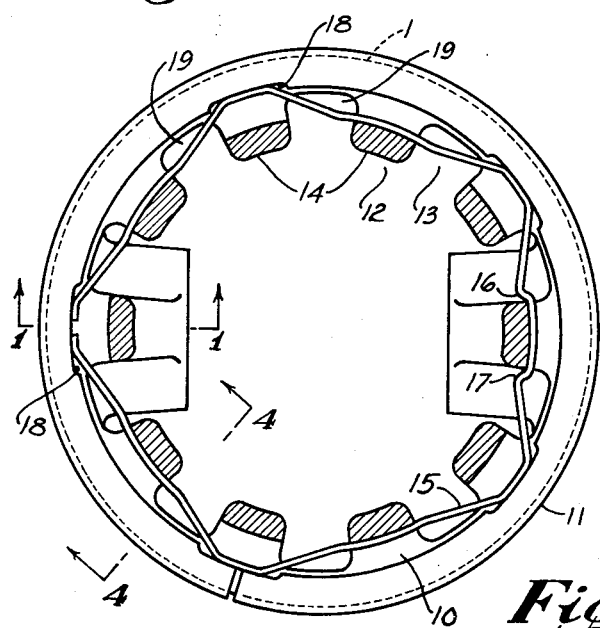
Figs. 2 and 3 are cross sections on a reduced scale, taken as indicated by correspondingly numbered lines on Fig. 1.
Figure 4:
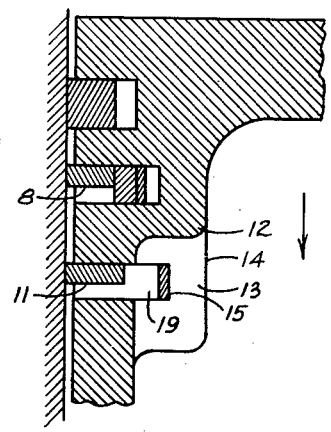
Fig. 4 is a fragmentary section on an enlarged scale, taken as indicated by line 4—4 of Fig. 2.
Figure 3:
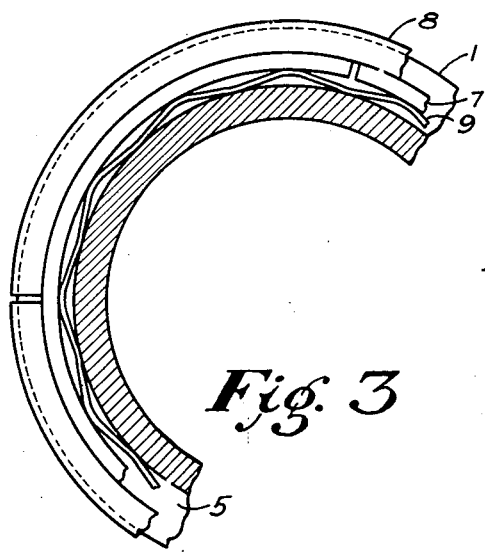

As clearly shown in Figs. 1 and 2, that portion of the piston wall between the skirt and the head which accommodates the ring grooves, sometimes called the ring belt, and indicated by the numeral 12, has a plurality of vertically extending pockets or recesses 13 separated by ribs or posts 14 which open to the inside of the piston and span the ring groove 10. The ring groove 10 is of such depth as to cut partly through the ribs 14, and thus opens into the recesses 13 between the ribs. The ring 11 has a width substantially less than the depth of the groove 10; thus, the groove 10 is vented into the recesses 13, and thence to the interior of the piston, such venting being controlled in accordance with the position of the ring 11.

An expander 15 is provided for the oil control ring 11. This expander is the full width of the groove 10 and, as shown in Fig. 2, engages the bottom of the groove 10 in alternate posts 14 and, at the intermediate posts, engages the inner surface of the ring 11. If desired, the expander 15 may be bent to form lugs 16 and 17 for engaging opposite sides of one of the posts 14 to restrain the expander against relative angular motion with the piston 1. Furthermore, the ring 11 may be provided with elongated notches, or cut-out portions 18 on its inner surface for accommodating the contacting portions of the expander 15. Due to the fact that the expander 15 extends the full width of the groove 10, the effective venting area is formed by those portions 19 of the recesses 13 within the expander 15, and which, obviously, are present on both sides of the groove. They provide a large venting area, permitting free passage of oil from groove 10 to the interior of the piston 1.

The operation of the rings is as follows: on the down stroke of the piston 1, rings 8 and 11 are urged against the upper side of their respective grooves 5 and 10, as shown in Fig. 1. Oil between the piston 1 and the cylinder wall 2 is scraped into the groove 10 by the control ring 11, entering the interior of the piston through vents 19, and thence returning to the crank case.

A small amount of oil escapes past the ring 11 and is trapped below the ring 8 in groove 5, where it assists the sealing action of the ring structure by forming a hydraulic seal between the piston 1 and the cylinder wall 2. Further, this body of trapped oil absorbs heat.

Figure 5:
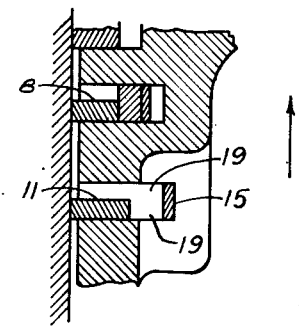
Fig. 5 is a view similar to Fig. 1, showing the rings in a different operating position.

There is a body of oil between rings 8 and 11 and the lower side of their respective grooves 5 and 10, collected on the down stroke of the piston, which serves to cushion the movement of the rings to the position shown in Fig. 5 in response to the piston starting its up stroke. The oil from below ring 8 escapes through the space above ring 11 (Figs. 2 and 5) to the inside of the piston via the venting areas 19. Upon the next down stroke, oil is again collected between the rings 8 and 11, and subsequently released. The successive bodies of oil trapped and released from the space below the ring 8 assist in cooling the piston and rings, particularly the ring structure 6.

Movement of rings 8 and 11 in their respective grooves serves to prevent any material carbon accummulation on the rings and the cooperating groove surfaces. This effect is produced by the pounding action of the rings against the sides of the grooves as the piston movement reverses. The pounding action of ring 8 is somewhat retarded by the friction encountered by ring 8 against the cylinder wall and the ring 7, and which is produced by expander 9. Similarly, the pounding action of ring 11 is retarded by the friction encountered by ring 11 against the cylinder wall and expander 15. The control of pounding in this manner can be such as to reduce the slap or blow to any desired amount. Accordingly, rings 8 and 11 can be made quite heavy without danger of producing serious inertia effects.

The piston structure shown herein is described and claimed in a divisional application, Ser. No. 242,881, filed July 23, 1951.

The inventor claims:

1. In a structure for sealing between a piston and a cooperating cylinder wall: a ring structure adapted to be accommodated in a groove in the piston, including a ring member movable axially of the groove, said ring member having an axial width substantially less than the groove and sealing against the cylinder wall and a seal ring extending completely across the groove for sealing between the inside of said ring member and the groove, said ring member serving to trap a body of oil in said groove between the sealing ring and the cylinder wall upon movement of the piston in one direction; and means for venting said body of oil exteriorly of the groove upon movement of the piston in the opposite direction.

2. In a piston ring structure accommodated in a ring groove in a piston: an outer ring member sealing against the cylinder wall, said ring member having an axial width substantially less than the groove, and movable axially across the groove in response to reversal of movement of the piston; and means extending completely across the groove for sealing between said ring and the groove.

3. In a piston ring structure adapted for accommodation in a ring groove in a piston: an outer ring member for resiliently sealing against the cylinder wall, said ring member having an axial width substantially less than the groove and movable axially across the groove in response to reversal of movement of the piston; and an inner ring member for resiliently engaging and sealing against the inside surface of the outer member, as well as sealing against the sides of the groove.

4. In an oil control device: a piston having a plurality of angularly spaced inwardly opening recesses disposed in the ring belt of tthe piston; there being a ring groove encircling the piston and in direct communication with said recesses; a ring disposed in said groove having a surface resiliently sealing against the cylinder and of substantially less thickness than the width of said groove, said ring being freely movable axially across the groove upon reversal of the piston movement.

5. In an oil control device: a hollow piston having a plurality of angularly spaced projections on the ring belt, extending inwardly from the inner wall of the piston and thereby forming between the projections, recesses disposed in the ring belt of the piston; there being a ring groove encircling the piston intermediate the ends of said recesses, and of a depth greater than the thickness of said ring belt, whereby the groove opens into the recesses; a ring disposed in said groove having a surface resiliently sealing against the cylinder and of substantially less thickness than the width of said groove, said ring being freely movable axially across the groove upon reversal of the piston movement.

6. In a structure for sealing between a piston and a cooperating cylinder wall: a ring structure adapted to be accommodated in a groove in the piston, including a ring member resiliently sealing against the cylinder wall and having a thickness substantially less than the width of the groove; means extending completely across the groove for sealing between the inside of said ring member and the groove; said ring member being movable axially of the groove in response to movement of the piston in one direction for trapping a body of oil therein between the sealing means and the cylinder wall; means for venting said oil to the interior of the piston upon reverse movement of the piston, said means forming a second groove encircling the piston, there being inwardly opening recesses in the piston intersecting said second groove; and a ring axially movable in said second groove and sealing against the cylinder wall.

7. In a structure for sealing between a piston and a cooperating cylinder wall: a ring structure adapted to be accommodated in a groove in the piston, including a ring member resiliently sealing against the cylinder wall and having a thickness substantially less than the width of the groove; means extending completely across the groove for sealing between the inside of said ring member and the groove; said ring member being movable axially of the groove in response to movement of the piston in one direction for trapping a body of oil therein between the sealing means and the cylinder wall; means for venting said oil to the interior of the piston upon reverse movement of the piston, said venting means forming a second groove encircling the piston, there being inwardly opening recesses in the piston intersecting said second groove; and a ring in said last mentioned groove resiliently sealing against the cylinder wall and having a thickness substantially less than the width of said second groove so as to move axially thereof in response to reversal in direction of the piston movement for venting said oil.

8. In a ring structure adapted to be accommodated in a piston groove: an inner ring sealing against the opposite sides of the groove; and an outer ring having a thickness substantially less than the clearance between the opposite sides of the groove and in sealing relation to the concentric annular surfaces of the cylinder wall and the said inner ring.

9. In a ring structure adapted to be accommodated in a piston groove: an inner ring sealing against the opposite sides of the groove; an outer ring having a thickness substantially less than the clearance between the opposite sides of the groove and in sealing relation to the concentric annular surfaces of the cylinder wall and the said inner ring; and an expander urging both rings outwardly.

FRED ERNST.

REFERENCES CITED

The following references are of record in the file of this patent:

UNITED STATES PATENTS

| Number | Name | Date |
|---|---|---|
| Re. 14,969 | Norwood | Oct. 26, 1920 |
| 1,313,905 | Mummert | Aug. 26, 1919 |
| 1,566,532 | Gersting | Dec. 22, 1925 |
| 1,736,530 | Graves | Nov. 19, 1929 |
| 1,822,101 | Lewis | Sept. 8, 1931 |
| 1,856,271 | Solenberger | May 3, 1932 |
| 2,078,519 | Wilkening | Apr. 27, 1937 |
| 2,083,636 | Caldwell | June 15, 1937 |
| 2,147,956 | Alexandresen | Feb. 21, 1939 |
| 2,200,015 | Alexandresen | May 7, 1940 |
| 2,228,495 | Williams | Jan. 14, 1941 |
| 2,244,166 | Marien | June 3, 1941 |
| 2,273,703 | Gille | Feb. 17, 1942 |
| 2,310,311 | Phillips | Feb. 9, 1943 |